United States Patent [19]

Elkins

[11] 4,124,773
[45] Nov. 7, 1978

[54] AUDIO STORAGE AND DISTRIBUTION SYSTEM

[76] Inventor: Robin Elkins, 5641 NW. 28th St., Lauderhill, Fla. 33313

[21] Appl. No.: 744,966

[22] Filed: Nov. 26, 1976

[51] Int. Cl.$^2$ .......................................... H04M 11/00
[52] U.S. Cl. .................... 179/2 A; 179/2 DP
[58] Field of Search ................... 179/2 R, 2 A, 2 DP, 179/1 B, 1 FS, 1 P, 15.55 R, 15.55 T; 340/172.5, 347 AD, 15.5 GC, 15.5 TS

[56] References Cited

U.S. PATENT DOCUMENTS

| | | | |
|---|---|---|---|
| 3,347,988 | 10/1967 | Marill | 179/2 DP |
| 3,444,324 | 5/1969 | Dougan | 179/2 DP |
| 3,444,550 | 5/1969 | Paulus | 340/347 AD |
| 3,448,216 | 6/1969 | Kelly | 179/15.55 R |
| 3,471,648 | 10/1969 | Miller | 179/15.55 R |
| 3,590,381 | 6/1971 | Ragsdale | 325/30 |
| 3,969,680 | 7/1976 | Wermuth | 179/1 P |

Primary Examiner—Kathleen H. Claffy
Assistant Examiner—Joseph A. Popek
Attorney, Agent, or Firm—Duckworth, Hobby, Allen & Pettis

[57] ABSTRACT

This invention relates to an electronic system and a method for storing and distributing audio signals over existing communication lines. The system comprises a compressor for compressing in a predetermined manner the waveform amplitude of an input analog signal, thereby forming a compressed analog signal. The compressed analog signal is then converted into a digital signal by an analog to digital converter. A digital interface subsystem stores and retrieves selected ones of the digital signals for transmission over a communications line. At a remote end of the communications line the digital signal is converted back to its analog compressed signal representation by a digital to analog converter. The compressed analog signal is then expanded in a manner complimentary to the compressor operation, thus reconstructing the analog signal. A selector generator is provided at the remote end of the communications line for generating a command signal over the communications line to command the digital interface subsystem to select the desired one of the stored digital signals.

12 Claims, 1 Drawing Figure

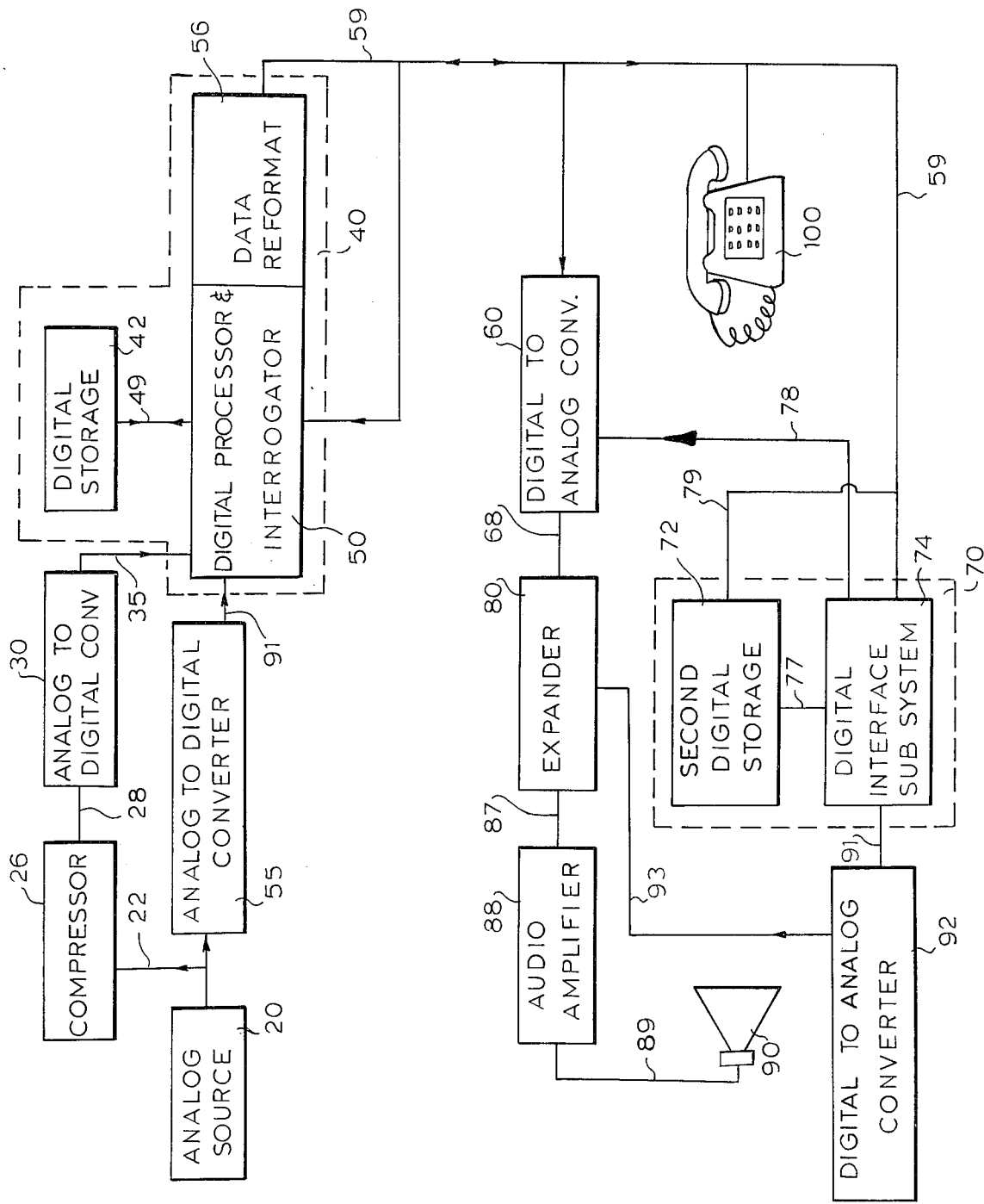

AUDIO STORAGE AND DISTRIBUTION SYSTEM

BACKGROUND OF THE INVENTION

1. Field of the Invention

This invention relates to audio storage and distribution systems, and in particular to digital communication systems which may be remotely controlled from a plurality of user locations.

2. Description of the Prior Art

The present state-of-the-art audio distribution systems may be classified into two general groups. The first type of audio system utilizes a central source of audio programming which transmits a sequence of audio program material over a master communications distribution system to a plurality of user locations. The user has no control over the sequence of the audio programming other than to adjust the volume, to change channels or to turn the programming on and off. The MUZAK music subcarrier system authorized by the Federal Communications Commission is one common example of this type of audio system.

A second type of audio system employs a master control center having a plurality of available audio program material which may be selected and sequentially arranged from a user center located nearby. In this second type of system the user may select and sequentially arrange several of the available programs. However, the communications requirements of this second type of system generally limits the separation between each of the user stations and the master control station to a relatively small geographic area. A common example of this type of system is the remote controlled audio system utilized by libraries or large universities to distribute audio program material to various remotely located student centers.

In contrast, the present invention uses a master data bank located at a central location which is coupled to a plurality of user locations by common communication lines, such as narrow band or wide band telephone lines. Special signal processing is accomplished both before the signal is transmitted over the lines and after the signal is received at the user location to optimize the signal quality to suit the particular limitations of the communications system. Each remotely located user position also includes a command section for generating a command signal over the communications line for being received at the central data location for selecting the desired sequence of the stored programs.

The prior art contains several examples of the type of technology required to implement this system. Von Muench in U.S. Pat. No. 3,626,096 discloses the use of a microphone coupled to an analog to digital converter for digitizing the analog signal. Palus in U.S. Pat. No. 3,444,550 discloses a system utilizing a logarithmic amplifier driving an analog to digital converter. Digital data transmission systems (MODEMS) of the type disclosed by Forney et al. in U.S. Pat. No. 3,887,768 and Ragsdale et al. in U.S. Pat. No. 3,643,023 are well known in the art.

SUMMARY OF THE INVENTION

This invention relates to an audio communications system for transmitting analog signals over communications lines. The system includes compressor means such as a logarithmic amplifier, for receiving the analog signal and processing the analog signal in a predetermined manner to match the input of an analog to digital converter means, which is provided for converting the processed analog signals to a digital signal. Digital interface means are provided for storing, retrieving and retransmitting the digital signal over the communications line. Digital to analog converter means are provided for receiving the digital signals from the communications line and converting the digital signals to the analog signals. Expander means are provided for expanding the waveform amplitude of the compressed analog signals in a predetermined manner for reconstructing the original analog signal. In a first preferred embodiment command means are provided for generating a command selection signal which is transmitted over the communications line from the remote location to the digital innerface means for selecting one or more of the digital signals thereon for being retrieved and retransmitted.

BRIEF DESCRIPTION OF THE DRAWINGS

Other objects, features and advantages of the present invention will be obvious from a study of the written description and the FIGURE which represents a schematic block diagram of a first preferred embodiment in accordance with the present invention.

DETAILED DESCRIPTION OF THE PREFERRED EMBODIMENT

A first preferred embodiment of the present invention is illustrated in the schematic block diagram of FIG. 1. The source of the analog signal, shown generally as 20, may be obtained from various components such as microphones, tape recorders, disc reproducers, etc. The analog output of the analog source 20 is coupled through the circuit conductor 22 to the input of a compressor 26. This device compresses the waveform amplitude in a predetermined manner for providing a compressed analog signal at the output thereof. Due to the extremely large amplitude peak to average ratio encountered in musical and voice type signals, a logarithmic amplifier or compressor is especially appropriate for use in audio systems of this type. Using a logarithmic compressor, the wavefrom amplitude of the input signal will be logarithmically compressed to reduce the peak to peak waveform amplitude excursions which will be experienced during the course of the program material. Distortion induced upon the compressed analog signal by the action of the logarithmic amplifier may be reduced by utilizing good circuit design techniques which may involve selecting time constants which compliment the type of program material to be transmitted.

The compressed analog signal output of the compressor 26 is coupled by the circuit conductor 28 to the input of an analog to digital converter 30. Such analog to digital converters are well known in the art and usually operate by generating an internal time base, sampling the analog signal input at some predetermined point in each of the time base segments, and then generating a digital output responsive to the sampled level obtained during the sampling period. The output of the analog to digital converter 30 may be either parallel digital or serial digital. Various types of digital coding are common for such analog to digital converters. For example, the compressed analog signal may be converted to a digital signal of the type known as pulse amplitude modulation (PAM) in which the amplitude of the digital pulse represents the amplitude of the compressed analog signal during the sampling time period. In pulse duration modulation (PDM) the amplitude of the pulses remains constant, while the pulse width is varied to indicate the relative signal amplitude as measured during the sampling period. The most common type of digital signal, and the type which may be preferred in this system if sufficient bandwidth is available, is the pulse code modulation (PCM) in which the sampled amplitude is converted to a digitally coded signal, such as binary coded decimal (BCD). For example the binary coded PCM signals may be preferred because they are generally compatable with certain digital data transmission systems of the type used to transmit computer data, etc.

The digital signal output of the analog to digital converter 30 is coupled through a circuit conductor 35 to one input of a digital interface device shown generally as 40. The digital interface device 40 comprises several subsystems including a digital storage subsystem 42 for receiving the digital signals and storing this information for later retrieval, and a digital processor and interrogator 50 which functions as an input/output device feeding the digital storage subsystem 42.

An optional distortion reduction circuit includes a second analog-to-digital converter 55 which has a first input coupled by the circuit conductor 22 to the analog source 20 for forming a digital representation thereof. The output of the second analog-to-digital converter 55 is coupled to a second input of the digital processor and interrogator 50 of the digital interface means 40 by the circuit conductor 91. Also, the digital processor 50 further includes digital processing circuitry for mathematically operating on the uncompressed digital signal with an algorithm corresponding to the input-output function of the compressor 26 and then comparing the digital compressed representation of the input signal with the mathematically derived compressed digital input signal from the line 91, in order to derive an error or distortion signal. This signal is then used to operate upon the signal obtained from line 91 so as to remove those distortion products inherent in the compressor 26. This processed signal is then available for storage in the digital storage device 42.

The digital interface device 40 includes a digital processor 50 for optimizing the format of the digital signals to interface with the format required by the storage system. The storage system 42 may include commonly available storage mediums such as magnetic tape, magnetic discs, capacitance coded discs or other various types of mechanical recording mediums. Bandwidths of up to 5 MHz and recording times of up to 30 minutes for multiple channel tape recorders or disc recorders are common illustrations of the present state of the art for these devices. Digital data may be recorded at extremely high bit rates with time division multiplexing being used to interleave the individual signals. On the other hand, frequency division multiplexing may be used to directly record on specific frequency bandwidths the low bit rate signals representative of each of the digital signals.

Electronic memories may also be used for the storage of these digital signals. Typical examples of electronic memories include bubble memories, Read Only Memories (ROMs), Random Access Memory (RAMs) and Charge Coupled Devices (CCDs). The advances in these technologies, as well as other technologies now under development, indicate that inexpensive, high density, electronic memories will soon be available for providing relatively rapid access to large quantities of digital information which can be stored and erased in a relatively small physical volume.

The digital output from the digital storage subsystem 42 is coupled by the circuit conductor 49 to another input of a digital processor and interrogator 50. The digital interrogator is designed to provide rapid access to the digital information stored within the digital storage subsystem 42. Therefore, the digital interrogator 50 must be compatible with the digital storage subsystem 42. While rapid access times in the range of 1 to 2 seconds are desirable, it is more likely that cost, power and size considerations may determine a tradeoff whereby access times of from 3 to 10 seconds may be equally suitable.

The digital interrogator 50 also includes a data reformating subsystem 56 which is designed to programmably reformat the digital signals retrieved by the digital interrogator 50 from the digital storage subsystem 42 in order that the signal quality may be optimized with regard to the electrical characteristics of a communications circuit 59. Data reformating subsystems 56 in accordance with these requirements are typically known as modem. A typical data modems may be capable of reformatting and transmitting digital data at rates of 4.8 kBps, 7.2 kBps. 916 kBps. 19.2 kBps and 56 kBps. Of course, the required bit rate will be determined by the bandwidth of the communications circuits available, the format of the digital signal, the allowable bit error rate and the required signal quality.

The digital signal output from the data reformatting subsystem 56 of the digital interrogator 50 is coupled to a first end of the communications circuit 59. The term communications circuit is used generically to describe the commonly available two-way communications links such as direct distance dial telephone lines, private leased lines, digital microwave communications networks, satellite communications networks, and wideband coaxial communications systems. At the present time, narrow band or wide band telephone lines are the most cost effective method of distributing digital data from one point to another. However, the rapid growth of technology may change this economic limitation shortly. For example, when two-way coaxial lines are commonly available into the home such as CATV systems and two-way interactive computer terminal systems, the unused bandwidth on the coaxial cables may prove to be extremely cost effective. One of the primary advantages of the digital transmission of data is that the quality and quantity of the signal available may easily be changed responsive to the addition of increased bandwidth, without the necessity of complete system redesign.

A digital to analog converter 60 is coupled to a second end of the communications circuit 59 at a remote receiving location. The digital to analog converter 60 will receive the digital signals along the communications circuits and reconvert the digital signal to its lotharithmic analog representation. In some applications it may be possible to design the system such that the format of the digital signal will be directly compatible with the required digital format of the digital to analog converter 60 so that no digital interface circuitry is required. However, when sophisticated digital incoding schemes are utilized it may be necessary to provide an additional level of interface circuitry, shown generally as 70, coupled to the second end of the communications line. A receiver digital interface subsystem 70 includes a second digital storage subsystem 72 having an input coupled to a communications line 59 by a circuit conductor 79. A circuit conductor 77 couples the output of the second digital interface subsystem 74. Another input of the digital interface subsystem 74 is coupled directly to the communications line 59. The digital interface subsystem 74 may receive directly the digital signals from the communications line 59 for reformatting and redirecting the digital signals in the proper format through a circuit conductor 78 coupled from the output thereof to another input of the digital to analog converter 60.

In this manner, the digital interface subsystem 74 may act as a modem for reformatting the digital signals so as to be compatible with the format required by the digital to analog converter 60. If an asynchronous modem is used as the digital interface subsystem 74, the second digital storage subsystem 72 may be utilized as a buffer storage device for accumulating the digital data signals prior to their processing by the digital interface subsystem 74. Also, the second digital storage subsystem 72 may comprise large capacity storage devices similar to those described for the digital storage subsystem 42, thereby enabling the storage of digital program material at the remote user location. These digital programs may be retrieved by the digital interface subsystem 74 in a manner similar to the operation of the digital interrogator 50 as previously explained.

After the compressed analog signal is recovered by the digital to analog converter 60 it is coupled through a circuit conductor 68 to an antilogarithmic input of an expander 80. The expander 80 operates in a manner complimentary to the compressor 26. In the preferred embodiment of the present invention the expander 80 is an anti-logarithmic amplifier for reconstructing the original analog waveform from the compressed analog signal serving as the input thereto. The analog signal is then coupled from an output thereof through a circuit conductor 87 to the input of an audio amplifier 88 which is used to drive a transducer 90 or other type of electrical load through the electrical conductor 89.

Another optional distortion reduction system similar in design and function to the one used on the previously discussed recording and storage circuitry may also be provided. Another digital to analog converter 92 has an input thereof coupled to the digital interface subsystem 74 for mathematically expanding the digital signal therefrom according to an algorithm representative of the input-output function of the expander 80. The mathematically derived analog signal is then coupled from an output through the circuit conductor 93 to another input of the expander 80 for being compared with the analog signal therefrom. An error or distortion signal is then fed back to the expander 80 for removing the distortion from the output analog signal, which is fed to the audio amplifier 88 through the circuit conductor 87.

A command signal generator 100 is coupled to the communications circuit 59. In the case where the communications circuit 50 comprises a typical 3 KHz bandwidth telephone line, the command signal generator 100 may comprise the TOUCHTONE telephone connected to this line and used for normal voice communications. The digital interrogator 50 as well as the digital interface subsystem 74 both contain command circuitry for responding to the tone command signals generated by the telephone. In this manner, codes may be designated for selecting the desired digital signals from the digital storage subsystem 42 or the second digital storage subsystem 72 by the operation of the command signal generator 100. In the case of wide band communications lines 59, the command generator 100 may comprise a digital command formatting for generating an inneractive digital signal for actuating the digital interrogator 50 or the digital interface subsystem 74. Of course, the TOUCHTONE type command system could also be used on the wide band communications lines.

The operation of the audio storage and distribution system will now be illustrated with reference to the FIGURE. First, an analog program source is coupled to the compressor for compressing the waveform amplitude. This compressed analog signal is then converted to a digital signal by the analog digital converter 30. A plurality of the digital signals are then sequentially stored within the digital storage subsystem 42 located at the central control location. As a user located at a remote location desires to listen to a selected one of the programs, the operator actuates the command signal generator 100 with a code representing the selected one of the stored programs. A command signal is transmitted along the communications circuit 59 and interpreted by the digital interrogator 50. The digital interrogator 50 then retrieves the selected one of the stored digital signals from the digital storage subsystem 42. The digital signal is then reformatted by the data reformatter 56 and transmitted along the communications circuit 59. Depending on the chosen data format for the digital signal, which is largely determined by the characteristics of the communications circuit 59, the digital signal may be received directly by the digital to analog converter 60 for conversion into the compressed analog signal which is then coupled to the expander 80 in order to be re-expanded to the original waveform amplitude. The analog signal output of the expander 80 is then coupled to the audio amplifier 88 for driving the transducer or load 90. If the characteristics of the communications circuit 59 require a special digital format for optimizing the quality of the signal received at the remote users end, the digital signal may be received by the digital interface subsystem 74 and reformatted in a digital code acceptable to the digital to analog converter 60. This digital signal is then processed as previously described.

The command signal generator 100 may also be utilized to select from a more limited library of program material stored in the second digital storage subsystem 72. This digital program material is retrieved by the operation of the digital interface subsystem 74 and coupled directly to the digital to analog converter 60 without being transmitted along the communications circuit 59. The second digital storage subsystem 72 may also be available as a buffer storage location to facilitate the proper operation of the digital interface subsystem 74 when operating in a modem configuration.

The preferred embodiment of the audio storage and distribution system has been described as an example of the invention as claimed. However, the present invention should not be limited in its application to the details illustrated in the accompanying drawing and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operability of the invention.

I claim:

1. An audio communications system for transmitting analog signals over a communications circuit, said system comprising in combination:
   compressor means for receiving the analog signal at an input thereof and compressing the waveform amplitude of the analog signal in a predetermined manner for generating a compressed analog signal at an output thereof;
   analog to digital converter means, having an input coupled to said output of said compressor means, for converting said compressed analog signal to a digital signal at an output thereof;
   digital interface means, having a first input coupled to said output of said analog to digital converter means, for storing and selectively transmitting said digital signals to an output thereof coupled to the communications circuit, said digital interface means including digital storage means coupled to said input for receiving and storing said digital signals, and retrieval means for recovering a selected one of said digital signals from said digital storage means for coupling to said output thereof, whereby selected ones of said digital signals may be randomly retrieved from said digital storage means;
   digital to analog converter means, having an input coupled at a remote location to the communications circuit, for reconverting said digital signal to said compressed analog signal at an output thereof;
   expander means, having an input coupled to said output of said digital to analog converter means, for expanding the waveform amplitude of said compressed analog signal in a predetermined manner for reconstructing the analog signal;
   means for transmitting a selector signal to said retrieval means from said remote location over said communication circuit; and
   means for decoding said selector signal for designating a selected digital signal to be retrieved.

2. The audio communications system as described in claim 1 wherein said digital storage means comprises electronic memories from one of Read Only Memories (ROMs) and Random Access Memories (RAMs).

3. The audio communications system as described in claim 2 further comprising in combination:
   selection means coupled to said retrieval means for instructing responsive to a first command signal at an input thereof said retrieval means as to the selected ones of said digital signals to be retrieved; and
   command means for generating said first command signal at an output thereof coupled to said input of said selection means by the communications circuit.

4. The audio communications system as described in claim 3 wherein first command signals are responsive to telephone station selection compatable signals.

5. The audio communications system as described in claim 3 wherein said retrieval means and said digital to analog converter means each further comprises modem means for reformatting said digital signals for transmission over the communications circuit, whereby the format of said digital signals may be optimized to suit the character of the communications circuits.

6. The audio communications system as described in claim 5 wherein the communications circuit comprises a telephone line having a bandwidth less than 4kHz.

7. The audio communications system as described in claim 3 further comprising in combination:
   second digital storage means for receiving and storing said digital signals; and
   second retrieval means for recovering selected ones of said digital signals from said second digital storage means, with said second retrieval means including an output coupled to a second input of said digital to analog converter means at the remote location, whereby a local source of said digital signals may be coupled to said digital to said analog conversion means.

8. The audio communications system as described in claim 7 wherein an input of said second digital storage means is coupled to said communications circuit for receiving and storing said digital signals therefrom.

9. The audio communications system as described in claim 3 wherein said compressor means comprises a logarithmic amplifier and wherein said expander means comprises an anti-logarithmic amplifier, with said logarithmic amplifier and said anti-logarithmic amplifier having complementary input-output functions.

10. The audio communications system as described in claim 1 further comprising:
    another analog to digital converter means for receiving the analog signal at an input thereof and for converting said analog signal to a digital signal at an output thereof; and wherein
    said digital interface means further includes computation means for performing mathematical computations on said digital signal for mathematically simulating said compressed analog signal from said compressor means, and wherein said digital interface means further comprises error correcting means for comparing said simulated compressed analog signal with said digital signal from said analog to digital converter and for correcting said digital signal responsive to any differences therebetween.

11. The system as described in claim 1 further comprising:
    means for reformatting said selected digital signal for optimum transmission characteristics along the communications circuit.

12. The system as described in claim 11 further comprising;
    means for un-reformatting said reformatted digital signal, thereby recovering said digital signal.

* * * * *